United States Patent
Landau et al.

(10) Patent No.: US 9,787,513 B2
(45) Date of Patent: Oct. 10, 2017

(54) SEQUENCE BASED DATA TRANSMISSION WITH RECEIVERS HAVING ONLY SIGN INFORMATION

(71) Applicant: Vodafone GmbH, Düsseldorf (DE)

(72) Inventors: Lukas Landau, Dresden (DE); Gerhard Fettweis, Dresden (DE)

(73) Assignee: VODAFONE GMBH, Dusseldorf (DE)

(*) Notice: Subject to any disclaimer, the term of this patent is extended or adjusted under 35 U.S.C. 154(b) by 0 days.

(21) Appl. No.: 15/098,837

(22) Filed: Apr. 14, 2016

(65) Prior Publication Data
US 2016/0308703 A1    Oct. 20, 2016

(30) Foreign Application Priority Data
Apr. 17, 2015   (EP) .................................... 15164112

(51) Int. Cl.
| | |
|---|---|
| *H04L 27/26* | (2006.01) |
| *H04B 1/04* | (2006.01) |
| *H04B 1/16* | (2006.01) |
| *H04B 1/00* | (2006.01) |
| *H04L 25/493* | (2006.01) |

(52) U.S. Cl.
CPC ....... *H04L 27/2608* (2013.01); *H04B 1/0007* (2013.01); *H04B 1/04* (2013.01); *H04B 1/16* (2013.01); *H04L 25/493* (2013.01)

(58) Field of Classification Search
CPC ... H04L 27/2608; H04L 25/493; H04B 1/007; H04B 1/04; H04B 1/16
See application file for complete search history.

(56) References Cited

U.S. PATENT DOCUMENTS

2002/0135914 A1* 9/2002 Stein ................ G11B 20/10009
                                                                360/46
2011/0188550 A1* 8/2011 Wajcer ................ H04L 25/068
                                                                375/214

* cited by examiner

*Primary Examiner* — Janice Tieu
(74) *Attorney, Agent, or Firm* — Workman Nydegger

(57) ABSTRACT

The present invention relates to a transmitter, a receiver and to corresponding methods for transmitting and receiving data utilizing sequences of non-return-to-zero, inverted (NRZI) symbols and symbol rates higher than the Nyquist rate in data transmission systems, thus enabling an enlarged spectral efficiency while utilizing simple receivers only having sign information.

16 Claims, 5 Drawing Sheets

| sequences of payload bits | sequences of mapped bits |
|---|---|
| 0 0 0 | 0 0 0 0 0 |
| 0 0 1 | 0 0 0 0 1 |
| 0 1 0 | 0 0 0 1 0 |
| 0 1 1 | 0 0 1 0 0 |
| 1 0 0 | 0 0 1 0 1 |
| 1 0 1 | 0 1 0 0 0 |
| 1 1 0 | 0 1 0 0 1 |
| 1 1 1 | 0 1 0 1 0 |

| sequences of NRZI bits | sequences of mapped NRZI symbols | |
|---|---|---|
| -1 -1 -1 | -1 -1 -1 -1 -1 | 1 1 1 1 1 |
| -1 -1 1 | -1 -1 -1 -1 1 | 1 1 1 1 -1 |
| -1 1 -1 | -1 -1 -1 1 1 | 1 1 1 -1 -1 |
| -1 1 1 | -1 -1 1 1 1 | 1 1 -1 -1 -1 |
| 1 -1 -1 | -1 -1 1 1 -1 | 1 1 -1 -1 1 |
| 1 -1 1 | -1 1 1 1 1 | 1 -1 -1 -1 -1 |
| 1 1 -1 | -1 1 1 1 -1 | 1 -1 -1 -1 1 |
| 1 1 1 | -1 1 1 -1 -1 | 1 -1 -1 1 1 |

SEQUENCE BASED DATA TRANSMISSION WITH RECEIVERS HAVING ONLY SIGN INFORMATION

CROSS-REFERENCE TO RELATED APPLICATIONS

This application claims priority to European Application Number 15164112.3, filed on Apr. 17, 2015, the entirety of which is incorporated herein by reference.

BACKGROUND OF THE INVENTION

1. The Field of the Invention

The present invention relates to a transmitter, a receiver and to corresponding methods for transmitting and receiving data utilizing sequences of non-return-to-zero, inverted (NRZI) symbols and symbol rates higher than the Nyquist rate in data transmission systems, thus enabling an enlarged spectral efficiency while utilizing simple transceivers (transmitters and/or receivers) which offer only lowest resolution in amplitude domain but enhanced resolution in time domain.

2. The Relevant Technology

In today's communication and data processing systems large amounts of information have to be handled. Especially the communication of huge streams of information is critical. Communications with data transfer rates of multiple gigabits per second are common. High requirements regarding communication speed and reliability necessitate complex transmission systems and methods, which are capable of transmitting fast and reliably such large amounts of information. Such information in form of data has to be transmitted between different systems and units. Hereby, radio transmission is a particular demanding field, due to addition-al sources of interference that add to the transmitted data signal. In order to cope with the high requirements in radio data transmission many different transmission strategies have been developed.

These strategies are based on different signal processing methods, wherein the information or payload data is processed before transmission in a transmission system and recovered at a receiving system. In the past more and more complex encoding and modulation methods were developed due to the rising volume of data to be transmitted. Usually the spectral efficiency is increased by introduction of a more complex modulation alphabet (more symbols). The different symbols of a modulation alphabet vary in phase, amplitude and/or frequency. A very successful representative is the Quadrature Amplitude Modulation (QAM) scheme. At the receiver a sampling unit comprising an analog-to-digital converter (ADC) can be deployed for digitizing a receive signal for further processing.

As a general rule, more complex modulation alphabets result in increased requirements for the ADC. According to the Nyquist-Shannon sampling theorem such ADCs must sample a received analog signal with a sampling frequency which is at least twice the maximum frequency of the received signal. The thusly defined minimum sampling rate is also known as Nyquist rate for sampling. At high sampling rates ADCs with high resolution in amplitude of a signal are difficult to realize and have a high power consumption.

These highly developed converters are a particularly cost intensive factor in receiver systems and the enormous power consumption of such ADCs is a critical drawback, particularly in receiver systems having a limited power source such as a battery, an accumulator and the like.

Consequently, a system and method for fast and reliable transmission of data without expensive and energy intense hardware components, especially at the receiver side, is desirable Hence, it is an objective of the present invention to solve or alleviate the technical problems and disadvantages inherent to the prior art and as set forth above. The present invention describes a transmitter and corresponding receiver for transmitting and receiving high speed data streams with energy efficient hardware components, especially at the receiver end.

BRIEF SUMMARY

Said objective is achieved by means of a transmitter, a receiver and corresponding methods for transmitting and receiving data and a system for data transmission. Further advantageous refined embodiments of the present invention are subject of the dependent claims. The features specified individually in the claims may be combined with one another in any desired, technologically meaningful way and may be supplemented by explanatory facts from the description, with further design variants of the invention being specified.

The invention relates to a transmitter for transmitting payload bits. The transmitter may comprise a coder that codes sequences of payload bits of length $m>1$ to sequences of non-return-to-zero, inverted (NRZI) symbols of length $n>2$, wherein $m<n$. Additionally, the transmitter may comprise a digital-to-analog converter (DAC) that converts the sequences of NRZI symbols to corresponding analog sequences of NRZI symbols, thus producing an analog transmit signal. The transmitter may further comprise an analog frontend for transmission of the analog transmit signal with a symbol rate that is higher than the Nyquist rate of the channel.

The payload bits are coded to antipodal symbols that only differ in their sign. The resolution in amplitude is hence minimal. Sequences of payload bits of length m are mapped to sequences of NRZI symbols of length n wherein $n>m$. Thereafter, the sequences of NRZI symbols are converted by the DAC to an analog transmit signal, which signal is hereupon transmitted by the analog frontend with a symbol rate that is higher than the Nyquist rate. This increased symbol rate does not lead to impairments caused by inter symbol interference (ISI) as sophisticated sequences of length n are transmitted.

The analog transmit signal represents the payload data only via minimal resolution in amplitude but with increased resolution in time. Therefore, the ADC deployed at the receiving end has only to discriminate between positive and negative amplitudes. This results in a more cost-effective receiver device for receiving the radiated signal that has additionally lower power consumption, because the power consumption of ADCs correlates with the resolution in amplitude as abovementioned.

In a first advantageous embodiment of the present invention the coder may comprise a mapper for mapping sequences of payload bits of length $m>1$ to sequences of mapped bits of length $n>2$, wherein $m<n$. The coder may further comprise an encoder for applying a NRZI encoding to the sequences of mapped bits, thus producing sequences of NRZI symbols.

In a second advantageous embodiment of the present invention the coder may comprise an encoder for applying a non-return-to-zero, inverted encoding to the payload bits, thus producing NRZI symbols. The coder may further comprise a mapper for mapping sequences of NRZI symbols of length m>1 to sequences of NRZI symbols of length n>2, wherein m<n.

Note that the functions of the encoder and of the mapper may be comprised in a single functional block that takes payload bits as input and produces sequences of length n of non-return-to-zero symbols as output.

In a further refined advantageous embodiment of the present invention the analog frontend may comprise a power amplifier for amplifying the analog transmit signal before transmission.

In yet a further refined embodiment of the present invention the analog frontend is an analog radio frontend for radio transmission of the analog transmit signal.

In still a further refined embodiment of the present invention two NRZI symbols of different sign are separated by at least d NRZI symbols of equal sign in the sequences of NRZI symbols, wherein d>0.

This spread of NRZI symbols with equal sign in time enables higher symbol rates thus yielding higher data transfer rates. The higher d the higher the symbol rate can be chosen resulting in higher data throughput.

In yet a further refined embodiment of the present invention a run of NRZI symbols of equal value does not exceed a length of k symbols, wherein k>d.

As no clock rate is transmitted a restriction for runs of equal symbols ensures sampling synchronization.

Further, the present invention relates to a receiver for receiving an analog transmit signal representing sequences of NRZI symbols. The transmitter may comprise an analog-to-digital converter for converting the analog transmit signal to corresponding NRZI symbols. Hereby, the sampling rate of the analog-to-digital converter is equal to a symbol rate of the analog transmit signal and higher than the Nyquist rate of the channel. Further, the transmitter may comprise a decoder for applying a non-return-to-zero, inverted decoding to the NRZI symbols, thus producing decoded bits. The transmitter may still further comprise a de-mapper for de-mapping sequences of length n>2 of decoded bits to sequences of recovered payload bits of length m>1, wherein m<n. Note that in one embodiment the functions of the decoder and of the de-mapper may be comprised in a single functional block that takes sequences of symbols as input and produces payload bits as output.

The received analog transmit signal, varying only in the sign of the amplitude, is converted by the ADC to digital NRZI symbols containing the transmitted information, wherein the sampling rate is equal to or higher than the symbol rate of the analog transmit signal. Said symbol rate is higher than the Nyquist rate. How-ever, the transmit signal can still be recovered at the receiver, because it contains sequences of symbols of length n reflecting m payload bits wherein n>m As described above the received analog transmit signal represents the payload da-ta by NRZI symbols. Therefore, a simple ADC having only to discern between a positive and a negative amplitude can be utilized in the receiver. Further, the sequences of NRZI symbols with length n allow for a sampling rate of the ADC that does not have to be higher than the symbol rate but can be equal to the symbol rate as chosen at the transmitter. Consequently, a more cost-effective ADC can be deployed that in addition consumes less power compared to ADCs with high resolution in amplitude as utilized in conventional receivers. The here described concepts are envisioned for data rates above 100 Gbit/s.

In a further advantageous embodiment of the receiver the ADC is an 1-bit ADC. The 1-bit ADC is sufficient to resolve the amplitude of the transmit signal, as the amplitude only varies in the sign. Therefore, the receiver can be produced more cost-effective and has lower energy consumption compared to ADCs with high amplitude resolution.

The refined methods for transmission and receiving as mentioned hereafter have the same advantages as the corresponding transmitters and receivers as set forth above. Consequently, the described transmitters and receivers have the same ad-vantages as the methods yet to be described (vice versa).

The present invention also relates to a corresponding method for transmitting payload bits comprising the steps of:

Coding sequences of payload bits of length m>1 to sequences of NRZI symbols of length n>2, wherein m<n;

Converting the sequences of NRZI symbols to corresponding analog sequences of NRZI symbols, thus producing an analog transmit signal; and Transmission of the analog transmit signal with a symbol rate that is higher than the Nyquist rate of the channel.

Information that is to be transmitted, in other words the payload data or bits, is segmented into sequences of m>1 and coded to sequences of NRZI symbols with a length of n>2. Hereby, the parameter n has to be greater than m thus increasing redundancy in the transmitted information that allows reconstruction of the payload data at the receiving end. In this regard, when increasing the time domain resolution the ratio between n and m needs to be increased at the same time. Vice versa, the higher said ratio, the greater the resolution in time. The sequences of NRZI symbols are converted into a corresponding analog representation or in other words into an analog transmit signal. This analog transmit signal is transmitted with a symbol rate higher than the Nyquist rate of the channel. The higher the aforementioned ratio between n and m, the higher the symbol rate can be chosen In an advantageous embodiment the step of coding comprises the steps of:

Mapping sequences of payload bits of length m>1 to sequences of mapped bits of length n>2, wherein m<n; and Applying a NRZI encoding to the sequences of mapped bits, thus producing sequences of NRZI symbols In the mapping the payload bits are grouped into sequences of payload bits of length m>1. These sequences are mapped to sequences of mapped bits of length n>2. This allows for a transmission with a symbol rate higher than the Nyquist rate for the used channel. Then, the NRZI encoding of the transmitter converts the incoming sequences of mapped bits to sequences of NRZI symbols of corresponding length that represent said payload data in form of changes in sign. Hereby, every logical 1 is represented by a change of sign and hence a zero-crossing in the sequences of NRZI symbols. The resolution of amplitude is consequently minimized, because only positive and negative values are discerned.

In another advantageous embodiment the step of coding comprises the steps of:

Applying a NRZI encoding to the payload bits, thus producing NRZI symbols; and

Mapping sequences of NRZI symbols of length m>1 to sequences of NRZI symbols of length n>2, wherein m<n.

The NRZI encoding transfers the payload bits to NRZI symbols. Hereby, each logical 1 is represented by a change of sign and hence a zero-crossing in the NRZI symbols. In other words, the resolution in amplitude is minimal as merely different signs (1 bit) are discerned. Subsequently, the NRZI symbols are partitioned in-to sequences of length m>1 and mapped to sequences of length n>2, wherein n>m. This mapping increases the resolution in time of the sequences of NRZI symbols allowing for a higher symbol rate upon transmission.

In any of the above described methods of coding, the analog transmit signal representing the payload data has minimal resolution in amplitude. Therefore, an analog-to-digital conversion having to discriminate between positive and negative amplitudes can be utilized. Further, the sequences of antipodal symbols with length n>m allow for a sampling rate that doesn't have to be higher than the symbol rate being higher than the Nyquist rate of the used channel. Hence, the transmitted signal can be received with cost-effective receivers that exhibit low power consumption, because the power consumption of ADCs deployed in such receivers correlates with the resolution in amplitude as abovementioned.

In a further advantageous refined embodiment of the method of transmission the analog transmit signal is amplified before transmission.

In yet a further refined embodiment of the transmission method the analog transmit signal may be radio transmitted.

Abandoning wired transmission increases the variability of the method of transmission, as the transmitter and receiver do not have to be physically connected. Further, the resistance inherent to any connection via cable and the heating due to dissipation along a connection line can be avoided.

A further refined embodiment of the present invention relates to a method of transmission wherein in the sequences of NRZI symbols two NRZI symbols of different sign are separated by at least d NRZI symbols of equal sign, wherein d>0.

The higher the parameter d, the higher the symbol rate can be chosen. This additional criterion for higher resolution in time enables symbol rates that are a multiple of the Nyquist rate.

Yet a further refined embodiment of the present invention relates to a method of transmission wherein in the sequences of NRZI symbols a run of NRZI symbols of equal value is at most of length k, wherein k>d As no reference clock signal is transmitted, the maximal number of equal symbols can be limited to allow a transmitter-receiver-system to synchronize.

The present invention further relates to a method for receiving an analog transmit signal representing sequences of NRZI symbols comprising the steps of
    converting the analog transmit signal to corresponding NRZI symbols, wherein the sampling rate is equal to a symbol rate of the analog transmit signal and higher than the Nyquist rate of the channel;
    applying a NRZI decoding to the NRZI symbols, thus producing decoded bits; and
    demapping sequences of decoded bits of length n>2 to sequences of recovered payload bits of length m>1, wherein m<n.

The received analog transmit signal, varying only in the sign of the amplitude, is converted to digital NRZI symbols, wherein the sampling rate is equal to the symbol rate of a corresponding transmitter signaling at a rate higher than the Nyquist rate of the used channel. The sampled single NRZI symbols are then NRZI decoded thus producing decoded bits. At last the transmitted information is recovered by applying a de-mapping, wherein sequences of decoded bits of length n>2 are converted to sequences of recovered payload bits of length n>m>1.

Note that in one embodiment the steps of decoding the digital NRZI symbols to decoded bits and de-mapping the decoded bits to payload bits may be combined to a single step that may be performed in a one functional block.

As already described the received analog transmit signal consists of antipodal symbols. A very simple analog-to-digital conversion that has only to discern be-tween positive and negative amplitudes can be utilized. Additionally when utilizing this analog-to-digital conversion, the sequences of NRZI symbols of length n allow for a sampling rate that is not higher than but equal to the symbol rate or an integer multiple of the symbol rate, which symbol rate is higher than the Nyquist rate of the channel. Consequently, a more cost-effective ADC can be deployed that consumes above that very little power compared to ADCs utilized in other methods of receiving high data rates.

In a further refined embodiment of the method for receiving converting is done with 1-bit resolution.

1-bit analog to digital converting is sufficient to resolve the amplitude of the transmit signal, as the amplitude only varies in the sign. Therefore, the conversion consumes less energy compared to conversions with high amplitude resolution.

The present invention also relates to a system that may comprise at least one transmitter according to any embodiment as described above. Each transmitter applies one of the methods of transmitting payload bits according to any embodiment as described above. Further the system may comprise at least one receiver according to any embodiment as described above. Each receiver applies one meth-od of receiving an analog transmit signal according to any embodiment as described above.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings, wherein the figures show.

DETAILED DESCRIPTION

In the present description the terms "payload data" and "payload bits" shall comprise information as well as additional overhead such as check sums and the like which may have been added to the actual information in preceding, not further specified processing steps. Those steps, i.e. the steps of source and channel encoding, are however apparent to a person skilled in the art and may be incorporated in any embodiment of the present invention.

Further, the term "data" is understood as a sequence of information and wherever this information is represented by one or more bits the both terms "data" and "bits" are used synonymously.

The terms "symbol rate" and "signaling rate" are used synonymously, too.

Still, the terms "NRZI symbols/sequences" and "antipodal symbols/sequences" are used synonymously in the description.

Finally, the term "same valued" shall be understood as "of the same magnitude and of the same sign".

Figure 1:
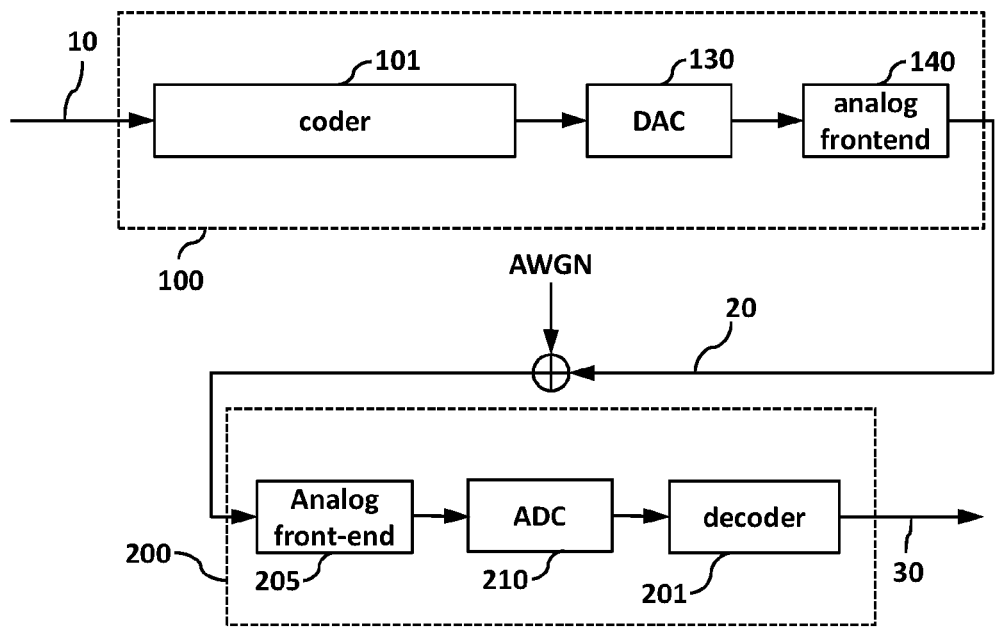
FIG. 1: Block diagram of a system comprising a transmitter and a receiver according to the present invention.

FIG. 1 depicts a system for data transfer via a channel, illustrating transmission of payload data 10 or respective bits by a transmitter 100 communicatively coupled to a receiver 200 via the channel. Receiver 200 processes an analog transmit signal 20 received from the transmitter 100 in order to recover payload data 30 or respective bits.

The payload data 10 is coded to sequences of non-return-to-zero, inverted (NRZI) symbols by coder 101. Hereby, the stream of incoming payload bits 10 is segmented into sequences of length m>1 and coded to sequences of length n>2. Parameter m has to be smaller than parameter n. Due to this coding every logical 1 in the payload bits 10 is represented by a zero-crossing of the transmit signal, respectively a change in sign in the corresponding NRZI symbols, wherein the resolution in time of each sequence of payload bits 10 is increased. Concrete embodiments of the coder 101 are described further below (see description of FIG. 2 and FIG. 4)

A digital-to-analog converter (DAC) 130 converts the NRZI symbols to corresponding analog NRZI symbols, thus producing an analog transmit signal 20.

Finally, the analog NRZI symbols forming the analog transmit signal 20 are trans-mitted via the channel by an analog frontend 140. The sampling rate at which the analog NRZI symbols are transmitted is higher than the Nyquist rate for the channel. Depending on the increase of resolution in time the symbol rate may be a multiple, not necessarily an integer multiple, of the Nyquist rate of the channel. In terms of achievable rate it is beneficial to choose the sampling respectively signaling rate as high as possible. In this regard, when assuming same channel proper-ties and higher signaling rate, the memory of the channel increases in terms of symbol durations. Note that a channel is considered having a memory if the out-put of the channel does not solely depend on the latest but also on previously sent symbols. In order to avoid ambiguities at the receiver the transmit sequences need to fulfill the d constraint, i.e. at least d+1 consecutive symbols are equal.

In order to further optimize the transmission the analog radio frontend 140 may comprise a power amplifier in order to enhance the power, respectively increase the amplitude of the analog transmit signal 20.

The transmission may be conducted either via a wired connection like a cable connection or via a radio channel. In the channel noise may be added to the analog transmit signal 20 (here modeled as additive white Gaussian noise, AWGN).

The analog transmit signal 20 is received by an analog front-end 205 comprised in the receiver 200 and sampled in an analog-to-digital converter (ADC) 210. Thereby, the analog transmit signal 20 is converted to corresponding digital NRZI symbols. Because sequences of NRZI symbols of length n are transmitted, the sampling rate of the ADC 210 doesn't have to be higher than but may be equal to the symbol rate that is higher than the Nyquist rate of the channel in order to take advantage of the proposed approach. Further, the received signal represents NRZI symbols that may be discriminated merely by their sign. This encoding allows utilization of a 1-Bit ADC, i.e. the ADC can discriminate between positive and negative amplitudes only, which in turn results in a very low power-consumption.

The sequences of NRZI encoded symbols of length n>2 are decoded by a decoder 201 to corresponding sequences of recovered payload bits 30 of length m>1, wherein m<n. This recovered payload data 30 ideally matches the original pay-load data 10.

Figure 2:
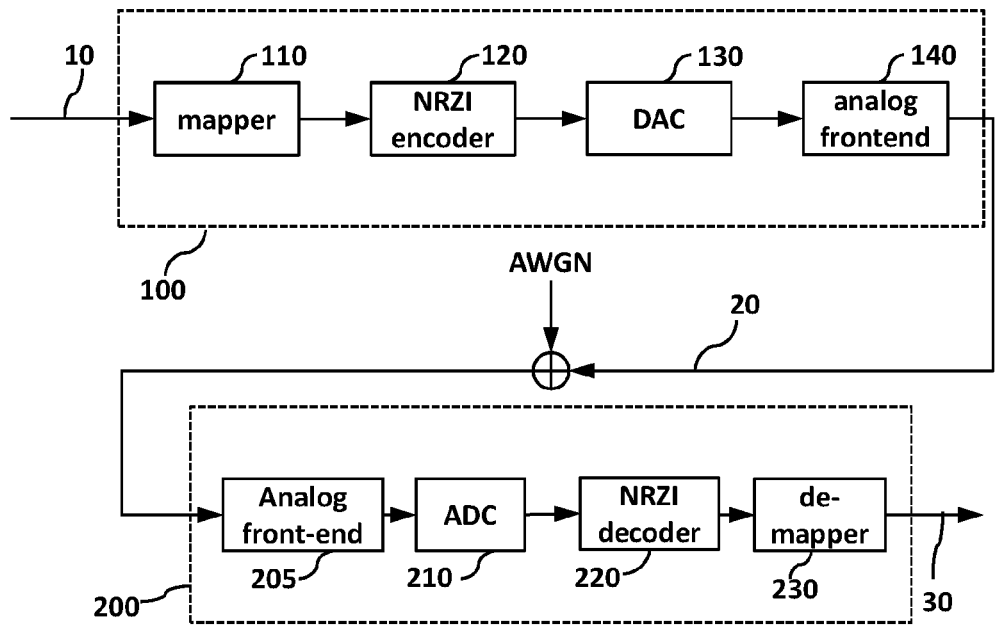
FIG. 2: Block diagram of a system comprising a first embodiment of a coder according to the present invention and a first embodiment of a de-coder according to the present invention.

FIG. 2 depicts a block diagram of a system as described above comprising a first embodiment of the coder 101 and a first embodiment of the decoder 201.

The coder 101 comprises a mapper 110. The mapper 110 maps sequences of pay-load bits 10 of length m to sequences of mapped bits of length n as will be described in detail further below (see description of FIGS. 3a, 3b). The length (parameter) n has to be larger than 2 and larger than length m that in turn has to be larger than 1. The difference between the two parameters is key for the available number of mapping symbols and the later sampling of the transmit signal 20 with a sampling rate below the symbol rate of the transmission.

The NRZI encoder 120 applies a NRZI conversion to the sequences of mapped bits. Each mapped bit is converted, so that every logical 1 of the mapped bits is represented by a change of sign of the resulting NRZI symbols, respectively a zero-crossing as will be described in detail further below (see description of FIG. 3b). Therefore resulting sequences of NRZI symbols, which are either +1 or −1, can be discriminated merely by determination of the sign.

The NRZI encoding converts the incoming stream of mapped bits that represent the payload data 10 to NRZI symbols. Thereby, every logical 1 of the mapped bits is represented by a change of sign in the NRZI symbols, resulting in said zero-crossings of the transmit signal 20. The resolution of amplitude is consequently minimized, because only positive and negative values are discerned. As a result, the sequences of payload bits of length m are first scaled up to sequences of mapped bits of length n and then transformed to NRZI symbols with an amplitude of either 1 or −1.

Note that in one embodiment mapper 110 and encoder 120 may be combined to a single functional block that takes payload bits and produces sequences of length n of non-return-to-zero symbols.

Further, the minimal distance between two NRZI symbols of different sign in the sequences of NRZI symbols of length n can be restricted by the so called d-constraint where d is an integer that has to be greater than 0. If before an anew change of sign in the sequences of NRZI symbols of length n occurs, then a mini-mum number of d symbols of equal sign have to occur, the symbol rate can be in-creased over the Nyquist rate for the used channel. In this regard, it is ensured that d+1 consecutive transmit symbols are equal. The higher d is selected, the less mapping symbols are available for the mapping in mapper 110.

Additionally a parameter k can be defined as upper limit for a run of consecutive NRZI symbols of equal sign. As there is no clock signal for synchronizing transmitter 100 and receiver 200 provided, the parameter k with k>d limits the maximal number of equal NRZI symbols following each other and facilitates thereby the synchronization between transmitter 100 and receiver 200.

Figures 3A, 3B:
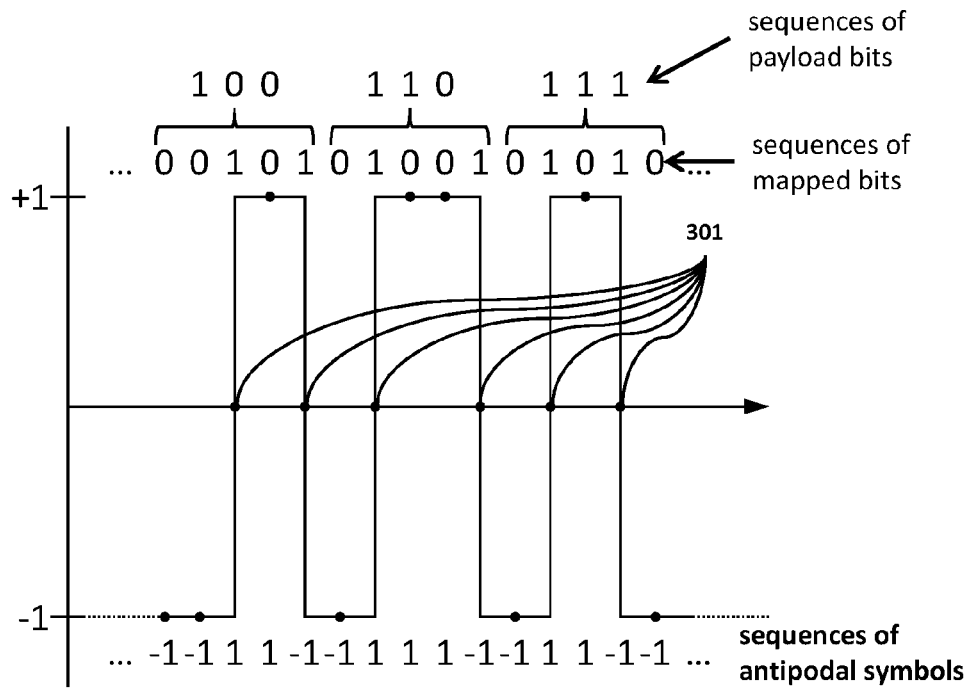
FIG. 3a: Schematic example of a mapping of sequences of payload bits of length m=3 to sequences of mapped bits of length n=5.
FIG. 3b: Schematic example of a NRZI encoding of sequences of mapped bits to sequences of NRZI symbols.

FIG. 3a depicts an exemplary mapping table for payload bits 10 as conducted in mapper 110. As mentioned above a mapping according to the present invention is characterized by the parameters m and n and preferably by the parameter d and k, too. Here, m=3 as can be seen in the first column of the table labeled with "sequences of payload bits" and n=5. In this embodiment all conditions, m>1, n>2 and n>°m, are fulfilled. Further the condition d=1 is realized by the depicted mapping. Hereto, the first bit of every sequence of mapped bits has to be equal to 0. The same result could be achieved by setting any other (or the same) digit to a fixed value of either 0 or 1. Thus, the resolution in time of the information represented by the sequences of payload bits 10 is increased. Additionally, the parameter d allows, while reducing the available number of mapping symbols, for a symbol rate higher than the Nyquist rate of the used channel. With d=1 a sampling rate of up to 2.5 times the Nyquist rate of the channel can be realized without occurrence of inter symbol interference (ISI).

FIG. 3b depicts an exemplary NRZI encoding in the NRZI decoder 120. Exemplary sequences of mapped bits as conducted in the first mapper 110 are converted to sequences of NRZI symbols. An exemplary row of payload bits 1 0 0 1 1 0 1 1 1 is separated into sequences of length m=3 resulting in 1 0 0, 1 1 0 and 1 1 1. These sequences of payload bits are then mapped to sequences of mapped bits of length n=5, yielding: 0 0 1 0 1, 0 1 0 0 1 and 0 1 0 1 0. The NRZI encoder transforms these sequences to sequences of NRZI symbols. In these sequences each logical 1 of the mapped bits is represented by a corresponding change of sign, respectively zero-crossing 301. As the preceding sign matters −1 is assumed as preceding value in the stream of NRZI symbols. The first two zeroes do not trigger a change of sign, therefore the value remains at −1. The 1 of the third bit does trigger a change of sign 301 and thus the next NRZI symbol is 1. This scheme is continued and hence the resulting sequences of NRZI symbols for the exemplary row of payload bits are: −1 −1 1 1 −1, −1 1 1 1 −1 and −1 1 1 −1 −1.

Figure 4:
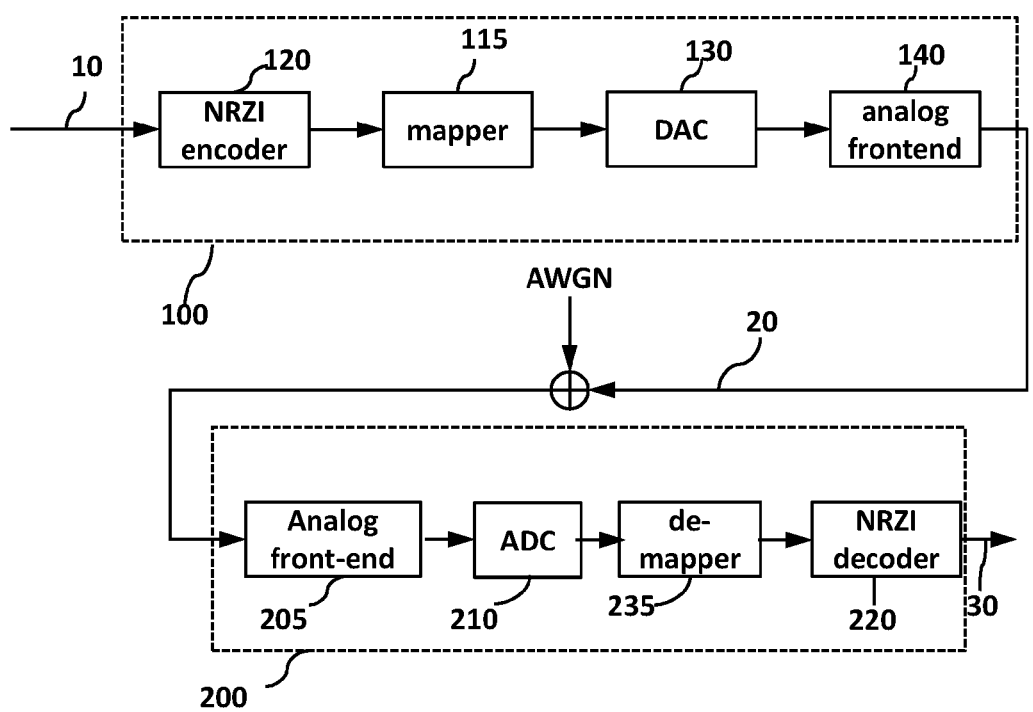
FIG. 4: Block diagram of a system comprising a second embodiment of a coder according to the present invention and a second embodiment of a decoder according to the present invention.

FIG. 4 depicts a block diagram of a system as described above comprising a second embodiment of the coder 101 and a second embodiment of the decoder 201.

The coder 101 comprises a NRZI encoder that transforms incoming payload bits 10 to NRZI symbols. Every logical 1 in the payload data 10 is represented by a zero-crossing/change of sign in the NRZI symbols as will be described in detail further below (see description of FIG. 5b). The resolution in amplitude is minimized to 1 bit discerning merely between positive and negative values.

The NRZI symbols are afterwards partitioned into sequences of NRZI symbols of length m>1 and mapped to sequences of NRZI symbols of length n>2 as will be described in detail further below (see description of FIG. 5a). Thereby, the resolution in time is increased.

As already described above (see description of FIGS. 1a, 1b) factors d>0 and k>d can be additionally introduced. This increases the obtainable sampling rate and synchronization between receiver 200 and transmitter 100.

Figures 5A, 5B:
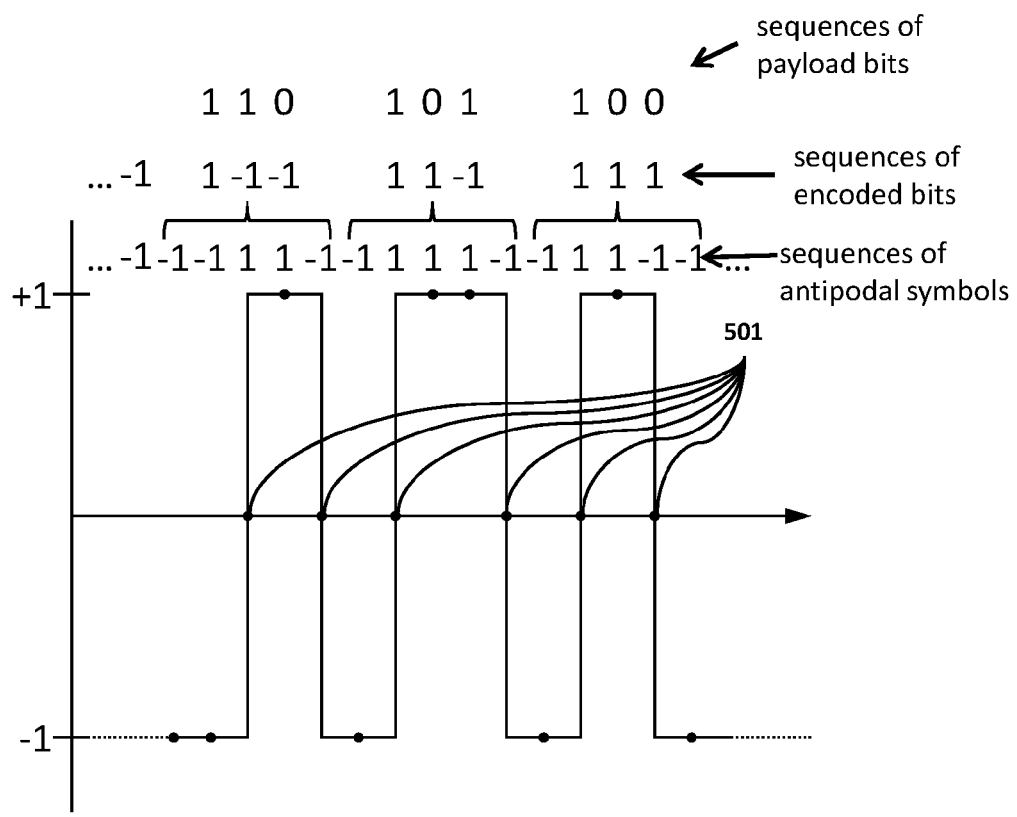
FIG. 5a: Schematic example of a mapping of sequences of NRZI symbols of length m=3 to sequences of NRZI symbols of length n=5.
FIG. 5b: Schematic example of a NRZI encoding of payload bits and subsequent mapping of sequences of NRZI symbols of length m=3 to sequences of NRZI symbols of length n=5.

FIG. 5a depicts a mapping as conducted in an exemplary mapper 115. NRZI symbols are grouped in sequences of m=3 symbols per sequence and then transformed into sequences of NRZI symbols of length n=5. The depicted mapping table has two columns for the sequences of mapped NRZI/antipodal symbols (the sequences with increased length and thus increased resolution in time). The correct mapping to be chosen can be selected by referring to the last NRZI symbol in the sequence of mapped NRZI symbols. If the last NRZI symbol in the preceding sequence was a −1 then the first column of the mapping table has to be selected for mapping the next sequence and vice versa. This guarantees that if the last symbol was a −1 then it is at least "repeated" once to fulfil the d=1 criterion. As described above the higher d and the higher the difference between n and m for increased number of mapping symbols, the higher the reachable symbol rate that may reach 2.5 times the Nyquist rate of the channel for d=1.

FIG. 5b depicts an exemplary NRZI encoding in the encoder 120 and a consecutive mapping in the mapper 115 of a short bit sequence representing possible sequences of payload bits 10. The exemplary sequences of payload bits 1 1 0, 1 0 1 and 1 0 0 contains information in a 1-bit coding. Here, a preceding NRZI symbol of value −1 is assumed. Each logical 1 is encoded by a zero-crossing, respectively a change in sign 501, whereas a logical 0 in the incoming payload bits doesn't change the sign of the corresponding NRZI symbol. A logical 1 can therefore be represented by transition from 1 to −1 or from −1 to 1 depending on the value of preceding bit. The first payload bit 1 results in a zero-crossing leading to a 1 as NRZI symbol. The next payload bit 1 again leads to a change of sign in the NRZI symbols. The following 0 does not change the sign of the NRZI symbol and is transformed into a −1. If the further encoding is done accordingly the exemplary payload sequences are NRZI encoded to the NRZI sequences: 1 −1 −1 1 1 −1 1 1 1. Then a mapping according to the table shown in FIG. 3a is done and (again assuming −1 as preceding symbol) the NRZI sequences of length m=3 are mapped to the following sequences of NRZI symbols of length n=5: −1 −1 1 1 −1, −1 1 1 1 −1 and −1 1 1 −1 −1.

The two different embodiments of the coder 101 and decoder 201 as described above may be combined arbitrarily. A coder 101 of a transmitter 100 comprising a mapper 110 and a NRZI encoder 120 as depicted in FIG. 2 may also be connected via a channel to a receiver 200 having a decoder 201 comprising a de-mapper 235 and a NRZI decoder 220 as depicted in FIG. 4. Vice versa a coder 101 as depicted in FIG. 4 and a decoder as depicted in FIG. 2 may be coupled. The respective de-mappers 230/235 have to be implemented according to the received transmit signal 20. A switchable mapper with two or more mapping tables selectable depending on the currently received signal 20 is also a possible solution.

In some of the above described embodiments and in the simulation indicating the benefits of the invention parameter k has been infinite. Even if not explicitly shown, said parameter k may be of finite value, d<k<∞. If parameter k is finite, then synchronization between transmitter and receiver as set forth above is enabled.

In a receiver 200 the incoming analog transmit signal 20 is received by analog front-end 205 and is sampled in the ADC 210 at a sampling rate that is equal to the symbol rate. While considering conventional fine grained quantization the sampling rate is chosen as larger or equal to twice as large as the highest frequency component in any band limited received signal this invention proposes a signaling method which only requires a one bit quantization and hence the sampling rate can be chosen only according to the signaling rate. As already described above the symbol rate can be of several magnitudes of the Nyquist rate of the used channel, e.g. 2.5 times the Nyquist rate of the channel for d=1, without the restrictions caused by ISI. Therefore, the transmitted information can be correctly recovered after said sampling with any of the above described embodiments of the decoder 201 comprised by receiver 200.

Figure 6A:
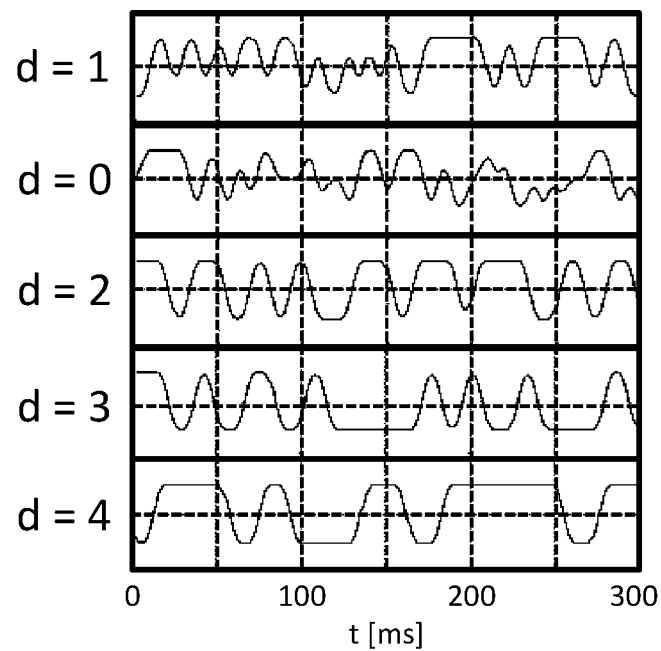
FIGS. 6a, 6b: Plots of simulation results.
Figure 6B:
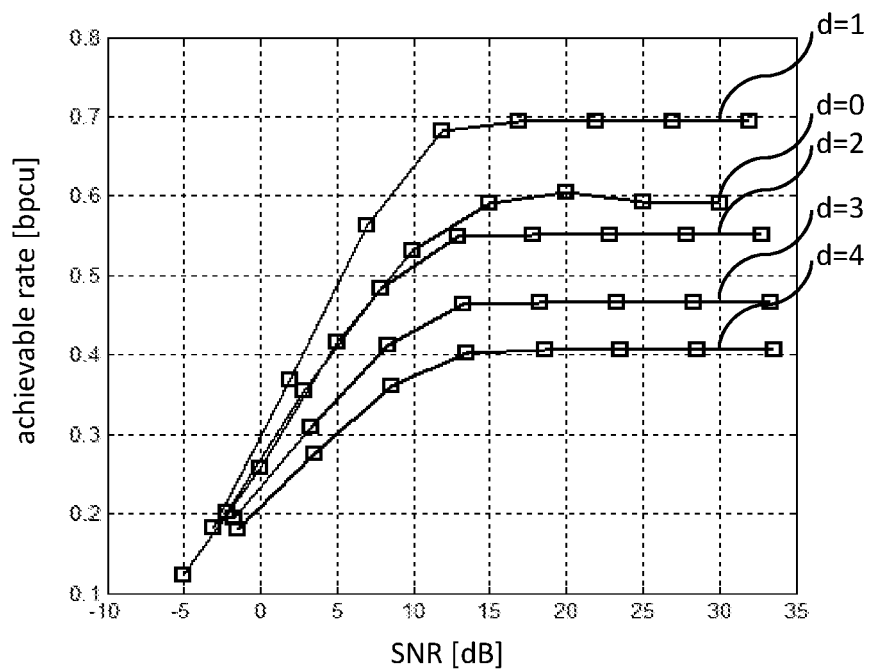

FIGS. 6a, 6b depict simulation results to demonstrate the efficiency. In the simulation a channel is considered which is characterized by an impulse response that is a truncated and raised cosine. The corresponding channel can be considered as quasi bandlimited. In this regard, the sampling respectively signaling rate is chosen twice as large as conventionally suggested for this class of channel. Further-more, max entropic sequences have been utilized which fulfill different d-constraints. The illustrated achievable rate can be asymptotically approached when considering infinite block length, corresponding to n, m=∞.

FIG. 6a shows different waveforms of a received random signal for different values of parameter d. The (simulated) analog transmit signal is transmitted with a symbol rate of 2 times the bandwidth of the considered channel. The sampling rate is equal to the symbol rate. Each graph has a different random signal as incoming payload data. Therefore, only qualitative statements regarding the wave form for different parameters d can be derived. The y-axis gives the amplitude of the signal and the x-axis gives the time t.

The upmost graph shows the waveform of the received signal for d=1. Here, be-tween each NRZI symbols of different sign 2 symbols of equal sign are located. The sign of the signal can clearly be determined, as there are sufficient high peaks, having the desired sign in both directions (positive or negative amplitude). The second graph shows the wave form for d=0. Here some Peaks are not sufficiently high to be distinguished when placed in between a train of symbols having the opposite sign. Respectively due to the higher inter symbol interference (ISI), un-ambiguous detection cannot be carried out. The following three graphs show the waveform for increasing d from 2 to 4. The sign of the signal can easily be deter-mined in all three cases.

FIG. 7b shows the achievable rate in bits per channel use (bpcu) versus the SNR in dB. As mentioned above in this simulation the sampling rate equals the symbol rate and is twice the bandwidth of the considered channel. It is noted, that in the trivial case with a symbol rate equal to the Nyquist rate of the channel, a signal with d=0 would yield up to 1 bpcu. Here the achievable rate is relative to the symbol rate which is approximately twice the Nyquist rate w.r.t. the channel. Therefore, the effective values for the achievable rate have to be multiplied by factor 2.

As can be seen in the graph the highest rate can be achieved for d=1. At sufficient SNR rates up to 1.4 bpcu (2*0.7 bpcu) can be achieved. This is a theoretical improvement of 40% over the trivial case (symbol rate=Nyquist rate of the channel, no ISI, d=0). For d=0 only lower rates due to the increased ISI can be achieved. With d>1 the rates become lower and lower due to the increased signal length, because with rising d more and more often two successive samples represent the same symbol (at constant symbol rate). In other words, the number of valid transmit sequences reduces with rising d.

The coder 101, as well as the decoder 201 of any of the above described embodiments may be implemented on a digital signal processing unit such as an ASIC, a PLD, a FPGA, a PC, and the like.

Alternatively, each unit of the coder 101 and encoder 201, namely the mapper 110/115, the NRZI encoder 120, NRZI decoder 220 as well as the de-mapper 230/235 may be implemented separately on one or different processing units.

The above described transmitter, receiver and corresponding methods for transmitting and receiving data in all their embodiments can preferably be used for da-ta transfer between chips and/or boards in close vicinity to each other.

The present communication approach can greatly reduce the power consumption required for the analog-to-digital conversion, particularly in short range communications with Multigigabit/s rates. In applications using wireless board-to-board communication and chip-to-chip communication within chip stacks, the present communication approach allows for utilization of simple and energy efficient transceivers.

What is claimed is:

1. A transmitter for transmitting payload bits comprising:
a coder for coding sequences of payload bits of length m>1 to sequences of non-return-to-zero, inverted (NRZI) symbols of length n>2, wherein m<n;
a digital-to-analog converter (DAC) for converting the sequences of NRZI symbols to corresponding analog sequences of NRZI symbols, thereby producing an analog transmit signal; and
an analog frontend for transmission of the analog transmit signal with a signaling rate that is higher than a Nyquist rate of a channel,
wherein the coder comprises:
a mapper for mapping sequences of payload bits of length m>1 to sequences of mapped bits of length n>2, wherein m<n; and
an encoder for applying a NRZI encoding to the sequences of mapped bits, thereby producing sequences of NRZI symbols.

2. A transmitter for transmitting payload bits comprising:
a coder for coding sequences of payload bits of length m>1 to sequences of non-return-to-zero, inverted (NRZI) symbols of length n>2, wherein m<n;
a digital-to-analog converter (DAC) for converting the sequences of NRZI symbols to corresponding analog sequences of NRZI symbols, thereby producing an analog transmit signal; and
an analog frontend for transmission of the analog transmit signal with a signaling rate that is higher than a Nyquist rate of a channel,
wherein the coder comprises:
an encoder for applying a NRZI encoding to the payload bits, thereby producing NRZI symbols; and
a mapper for mapping the sequences of NRZI symbols of length m>1 to the sequences of NRZI symbols of length n>2, wherein m<n.

3. The transmitter according to claim 1, wherein the analog frontend is an analog radio frontend for radio transmission of the analog transmit signal.

4. The transmitter according to claim 1, wherein in the sequences of NRZI symbols at least d+1 consecutive symbols have an equal sign, wherein d>0.

5. A receiver for receiving an analog transmit signal representing sequences of non-return-to-zero, inverted (NRZI) symbols comprising:
an analog-to-digital converter (ADC) for converting the analog transmit signal to corresponding NRZI symbols, wherein the sampling rate of the ADC is equal to a signaling rate of the analog transmit signal and higher than a Nyquist rate of a channel; and a decoder for decoding sequences of NRZI symbols of length n>2 to sequences of recovered payload bits of length m>1, wherein m<n, wherein the decoder comprises:

a NRZI decoder for applying a NRZI decoding to the NRZI symbols, thereby producing decoded bits; and a de-mapper for de-mapping the sequences of length n>2 of decoded bits to the sequences of recovered payload bits of length m>1, wherein m<n.

6. The receiver according to claim 5, wherein the ADC is a 1-bit analog-to-digital converter.

7. The receiver according to claim 5, wherein in the sequences of NRZI symbols at least d+1 consecutive symbols have an equal sign, d>0.

8. A receiver for receiving an analog transmit signal representing sequences of non-return-to-zero, inverted (NRZI) symbols comprising:

an analog-to-digital converter (ADC) for converting the analog transmit signal to corresponding NRZI symbols, wherein the sampling rate of the ADC is equal to a signaling rate of the analog transmit signal and higher than a Nyquist rate of a channel; and a decoder for decoding sequences of NRZI symbols of length n>2 to sequences of recovered payload bits of length m>1, wherein m<n, wherein the decoder comprises:

a de-mapper for de-mapping sequences of NRZI symbols of length n>2 to sequences of NRZI symbols of length m>1, wherein m<n; and a NRZI decoder for applying a NRZI decoding to the NRZI symbols, thereby producing recovered payload bits.

9. A method for transmitting payload bits, comprising the steps of:

coding sequences of payload bits of length m>1 to sequences of non-return-to-zero, inverted (NRZI) symbols of length n>2, wherein m<n;

converting the sequences of NRZI symbols to corresponding analog sequences of NRZI symbols, thereby producing an analog transmit signal; and transmitting the analog transmit signal with a signaling rate that is higher than the Nyquist rate of a channel, wherein the step of coding comprises the steps of:

mapping sequences of payload bits of length m>1 to sequences of mapped bits of length n>2, wherein m<n; and applying a NRZI encoding to the sequences of mapped bits, thereby producing sequences of NRZI symbols.

10. The method for transmitting according to claim 9, wherein the analog transmit signal is radio transmitted.

11. The method for transmitting payload bits according to claim 9, wherein in the sequences of NRZI symbols of length n, two NRZI symbols of different sign are separated by at least d NRZI symbols of equal sign, wherein d>0.

12. A method for transmitting payload bits, comprising the steps of:

coding sequences of payload bits of length m>1 to sequences of non-return-to-zero, inverted (NRZI) symbols of length n>2, wherein m<n;

converting the sequences of NRZI symbols to corresponding analog sequences of NRZI symbols, thereby producing an analog transmit signal; and transmitting the analog transmit signal with a signaling rate that is higher than the Nyquist rate of a channel, wherein the step of coding comprises the steps of:

applying a NRZI encoding to the payload bits, thereby producing NRZI symbols; and mapping the sequences of NRZI symbols of length m>1 to the sequences of NRZI symbols of length n>2, wherein m<n.

13. A method for receiving an analog transmit signal representing sequences of non-return-to-zero, inverted (NRZI) symbols comprising the steps of:

converting the analog transmit signal to corresponding NRZI symbols, wherein the sampling rate is equal to a signaling rate of the analog transmit signal and higher than the Nyquist rate of a channel; and decoding sequences of NRZI symbols of length n>2 to sequences of recovered payload bits of length m>1, wherein m<n, wherein the step of decoding comprises the steps of:

applying a NRZI decoding to the NRZI symbols, thereby producing decoded bits; and de-mapping the sequences of decoded bits of length n>2 to the sequences of recovered payload bits (30) of length m>1, wherein m<n.

14. The method for receiving according to claim 13, wherein in the sequences of NRZI symbols of length n, two NRZI symbols of different sign are separated by at least d NRZI symbols of equal sign, wherein d>0.

15. The method for receiving according to claim 13, wherein converting is done with 1-bit resolution.

16. A method for receiving an analog transmit signal representing sequences of non-return-to-zero, inverted (NRZI) symbols comprising the steps of:

converting the analog transmit signal to corresponding NRZI symbols, wherein the sampling rate is equal to a signaling rate of the analog transmit signal and higher than the Nyquist rate of a channel; and decoding sequences of NRZI symbols of length n>2 to sequences of recovered payload bits of length m>1, wherein m<n, wherein the step of decoding comprises the steps of:

de-mapping the sequences of NRZI symbols bits of length n>2 to the sequences of NRZI symbols of length m>1, wherein m<n; and applying a NRZI decoding to the NRZI symbols, thereby producing recovered payload bits.

* * * * *